Figure 1:
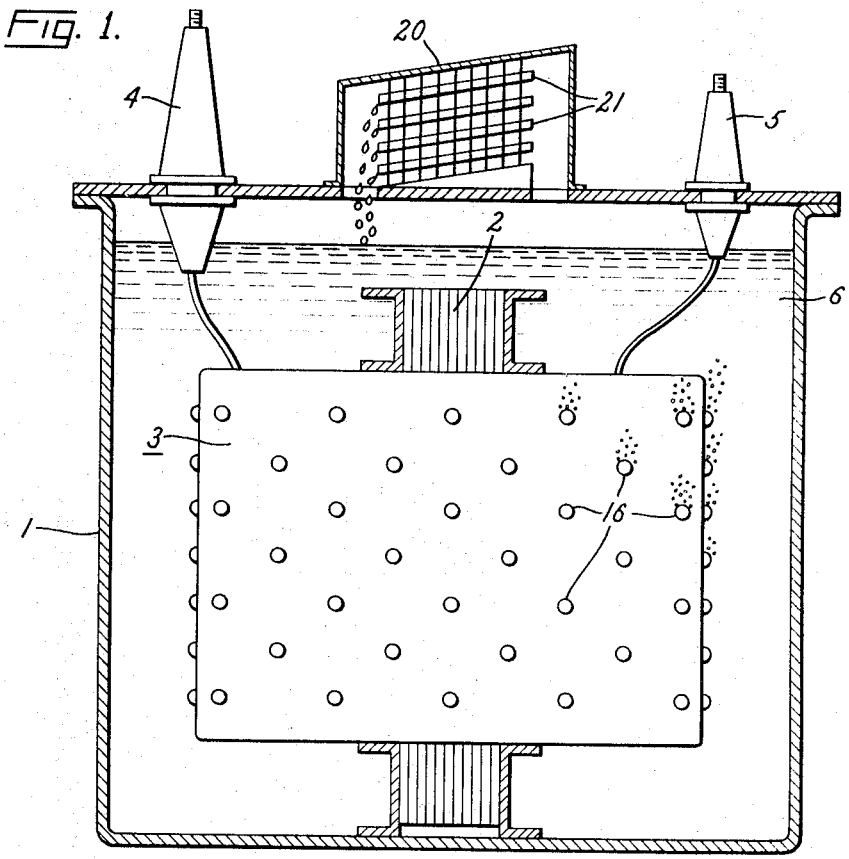

United States Patent

[11] 3,614,693

| [72] | Inventor | Langdon T. Frey, III<br>Newton, N.C. |
|---|---|---|
| [21] | Appl. No. | 86,764 |
| [22] | Filed | Nov. 4, 1970 |
| [45] | Patented | Oct. 19, 1971 |
| [73] | Assignee | General Electric Company |

[54] LIQUID COOLING OF ELECTRICAL APPARATUS
5 Claims, 2 Drawing Figs.

[52] U.S. Cl. ................................................ 336/58,
62/527, 165/105, 174/15 R, 310/64, 336/61, 336/96
[51] Int. Cl. ......................................................... H01f 27/10
[50] Field of Search ............................................ 336/55, 57, 58, 61, 96, 205; 174/15; 62/527; 165/105; 310/54, 64

[56] References Cited
UNITED STATES PATENTS

| 3,201,728 | 8/1965 | McWhirter | 336/60 |
| 3,142,809 | 7/1964 | Remenyik | 336/61 |
| 3,262,078 | 7/1966 | Foenster | 336/96 X |
| 3,428,928 | 2/1969 | Maines | 336/61 |
| 3,541,487 | 11/1970 | Leonard | 336/61 |

*Primary Examiner*—Thomas J. Kozma
*Attorneys*—J. Wesley Haubner, Frank L. Neuhauser, Oscar B. Waddell and Joseph B. Forman ABSTRACT: A power transformer having its main high-power windings encapsulated in a cast body of epoxy resin is filled with a dielectric cooling liquid having a boiling point slightly above the normal full load operating temperature of the cast coil assembly. To enhance cooling of the coil by the ambient liquid heat-conducting pins embedded in the windings extend to the outer surface of the coil assembly and have exposed surface areas sufficiently small to exceed the vaporization temperature of the liquid. Consequently bubbling from these boiling sites enhances heat transfer over substantially the entire coil surface.

PATENTED OCT 19 1971 3,614,693

INVENTOR:
LANGDON T. FREY, III,
BY [signature]
ATTORNEY

LIQUID COOLING OF ELECTRICAL APPARATUS

BACKGROUND AND OBJECTS OF THE INVENTION

My invention relates to cooling of electrical apparatus by means of vaporizable liquid, and more particularly to such cooling of static electric induction apparatus such as power transformers, reactors and the like. The invention is especially applicable to any electrical apparatus having main high-power inductive windings enclosed in a cast outer sheath of insulating resin or the like.

Encapsulation of electrical coil windings in cast insulating materials such as phenolic, polyester or epoxy resins is commonly used in such low-power electrical apparatus as motor starters and other control devices. While resin encapsulation diminishes the ability of an electrical coil to dissipate heat generated by the current passing through it, heat dissipation has generally not proven to be a critical or limiting parameter in low-power electrical devices having current ratings at the level of control or communication circuits.

In design of electric induction apparatus for high-power applications, such as transmission and supply transformers and reactors for utility and industrial applications, it has long been recognized that dielectric strength close to the windings could be improved by encapsulating the main high-power windings in solid insulating material, and that overall size and weight of the apparatus could be reduced accordingly. However, solid encapsulation of large multilayer windings of high-power rating introduces severe cooling problems not susceptible to resolution by the usual expedient of immersing transformer coils in oil or other liquid-cooling media. Casting resins having good electrical insulating qualities are generally not good heat conductors, so that a resin-sheathed coil tends to retain internally generated heat however its outer surface may be cooled.

Accordingly it is a general object of my invention to provide new and improved cooling means for electrical induction apparatus having coil windings sheathed in solid thermosetting insulating material.

It is a more particular object of my invention to provide improved means for utilizing a vaporizable liquid to cool resin-encapsulated coil assemblies in high-power electric induction apparatus.

In carrying out my invention in one preferred embodiment I encapsulate the main coil winding assembly of an electric power transformer in a cast body of epoxy resin and immerse it in a dielectric cooling liquid having a boiling point only slightly above the normal operating temperature of the coil assembly under load conditions. To enhance cooling of the coil assembly by the ambient liquid, heat-conducting pins are embedded in the windings and extend to the outer surfaces of coil assembly. The outer ends of the heat-conducting pins are exposed but substantially flush with the surface of the cast coil assembly and are sufficiently small to exceed the vaporization temperature of the ambient liquid. Consequent bubbling from these boiling sites enhances heat transfer over substantially the entire coil surface.

Figure 2:
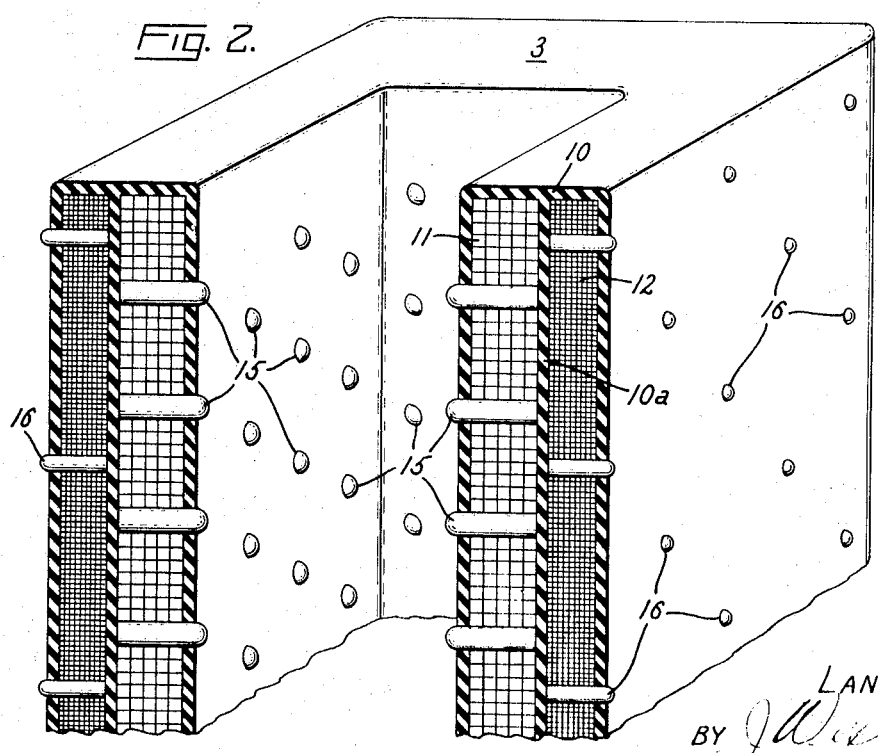

My invention will be more fully understood and its various objects and advantages further appreciated by referring now to the following detailed specification taken in conjunction with the accompanying drawing in which:

FIG. 1 is a side elevational view, partly in section, of an electric power transformer embodying my invention; and FIG. 2 is a perspective view, partly in section, of a coil winding assembly for the transformer shown at FIG. 1.

Referring now to the drawing, and more particularly to FIG. 1, I have shown therein an inductive electric apparatus comprising a sealed tank or housing 1 within which is mounted in mutually cooperative relation a magnetizable core 2 and a coil winding assembly 3. While the coil winding assembly 3 may include one or more windings, as desired, I have chosen for illustration a power transformer coil (shown in greater detail at FIG. 2) in which separate high-voltage and low-voltage windings terminate, respectively, at high-voltage and low-voltage line terminal bushings 4 and 5.

For the purpose primarily of cooling the transformer coil assembly 3 the tank 1 is filled to a level above the coil with a suitable body of liquid 6 which has a relatively low boiling point within the normal range of operating temperatures of the coil assembly 3. It is of course desirable that the liquid body 6 serve also as an electric insulator and several fluorocarbon compounds having dielectric properties and low boiling point are known to those skilled in the art. A preferred composition of vaporizable cooling and insulating fluid is perfluorocyclic ether ($C_8F_{16}O$).

As shown at FIG. 2 the coil assembly 3 comprises two annual current-conducting windings 11 and 12 radially juxtaposed and encased in a common outer sheath 10 of solid insulating material. The windings 11 and 12 are separated radially by a "main gap," as commonly provided between high-voltage and low-voltage transformer windings. Preferably the outer insulating sheath 10 is cast or molded to completely impregnate and encapsulate the windings 11 and 12, thereby to form an integral annual barrier 10a in the main gap and to fill all other interstices of the windings with the molding compound. Many suitable thermosetting molding resins having appropriate electric-insulating qualities are known to those skilled in the art. Such materials may be, for example, phenolic, polyester or epoxy molding resins of sufficiently low viscosity to impregnate the coil windings without formation of voids. Moldings materials especially suitable for this purpose are the alumina-filled epoxy resins described in U.S. Pat. Nos. 2,997,527—Kessel and Norman.

The cast coil assembly 3 includes heat-conducting members embedded in the windings and extending transversely of the winding turns to conduct heat generated within the coil to points just outside the surface of the encapsulating sheath 10. At FIG. 2 such heat conductors are shown as a plurality of rods or pins 15 extending radially inward through the winding 11 and a plurality of similar rods or pins 16 extending radially outward through the winding 12. All the rods 15 and 16 protrude through the insulating sheath 10 and terminate immediately adjacent its outside surface. The protruding ends of the rods 15 and 16 are of small or limited surface area in the sense that the exposed area of each rod is no greater than several times the area of the internal cross section of the rod, and may if desired be of the same size or smaller; i.e., is of the same general order of magnitude as the internal cross section of the rod. By referring to an exposed end of small or limited area I mean to include any area of the same general order of magnitude as the internal cross-sectional area which permits the exposed end to attain in normal operation a temperature sufficient to vaporize the liquid 6 even though the adjacent surface of sheath 10 remains below the boiling temperature. The rods 15 and 16 are so embedded in the windings 11 and 12 respectively, that they are in good heat transfer relation with the adjacent winding turns, and their exposed ends extend only slightly beyond the outside surface of sheath 10 so that the boiling sites formed at the ends of the rods are effectively on the surface of sheath 10.

The heat conducting rods or pins 15 and 16 are, of course, not in electrically conducting relation with winding turns; they may either be insulated from the winding or formed of an electrically nonconducting material. Preferably the rods are formed of a material which is a good conductor of heat but a poor conductor of electricity, i.e., an electrical insulator. Suitable dielectric heat-conducting materials which I prefer for this purpose are beryllium oxide and aluminum oxide. The rods 15 and 16 may of course be of any desired cross section and may be solid or tubular, but preferably they are of elongate or rodlike configuration in that their major or axial dimension is considerably greater than the greatest transverse dimension.

In operation, each protruding end of the heat-conducting members 15 and 16 constitutes a boiling site on the surface of the cast coil assembly 3 and beneath the surface the cooling and insulating liquid 6. Vaporization of liquid at each such site generates bubbles of vapor which rise along the surface of the coil assembly. As these bubbles rise to the liquid surface they carry away from the boiling sites the considerable heat of vaporization expended in the boiling action. In addition, the upward movement of bubbles along the surface of the coil sheath 10 has the effect of "scrubbing" that surface by disturbing and displacing the boundary layer of liquid, heat transfer from the entire surface of coil sheath 10 to the surrounding liquid 6 is improved; in this manner conductive cooling of the coil assembly is promoted over the entire coil surface even though vaporization of liquid occurs only at the boiling sites formed by the heat conducting rods 15 and 16.

In order to condense and return to the liquid body 6 the vaporized fluid which is boiled off as described above I provide suitable condensing means associated with the tank 1.

By way of illustration I have shown at FIG. 1 an upper housing portion 20 built into the lid of tank 1 and containing a plurality of cooling tubes 21. It will be evident of course to those skilled in the art that vapor generated at the boiling sites on the surface of the coil assembly 3 rises through the surface of the liquid body 6 into the condenser housing 20, is condensed on the tubes 21 and thereafter is returned to the liquid body 6 in the form of droplets.

While I have shown and described a preferred embodiment of my invention by way of illustration, many modifications will occur to those skilled in the art. I therefore intend herein to cover all such modifications as fall within the true spirit and scope of my invention.

What I claim as new and desire to secure by Letters Patent of the United States is:

1. In an electrical induction apparatus, a coil assembly including a current-conducting winding enclosed in a sheath of insulating material, a sealed housing adapted to contain a body of liquid having a vaporization temperature within the normal range of operating temperatures of said coil assembly, means mounting said coil assembly within said housing for at least partial immersion in said liquid, a plurality of heat-conducting rods embedded in said winding in intimate heat transfer relation with the adjacent turns of said winding, said heat-conducting rods having head portions extending through said sheath and terminating closely adjacent the outer surface thereof, said head portions of said rods having exposed surface area sufficiently small that their temperature in normal full-load operation of said apparatus exceeds the vaporization temperature of said liquid while adjacent surface areas of said sheath remain below the vaporization temperature.

2. In an electrical induction apparatus, a coil assembly including a current-conducting winding encapsulated in a cast body of solid insulating material having an outer surface, a sealed housing adapted to contain a body of liquid having a boiling temperature within the normal range of operating temperatures of said coil assembly, means mounting said coil assembly within said housing for immersion in said liquid, a plurality of heat-conducting rods embedded in said winding and in intimate heat transfer relation with the adjacent turns of said winding, said heat-conducting rods having heat portions extending through said outer surface and terminating closely adjacent said surface, each said head portion having an exposed surface area of the general order of magnitude of the internal cross-sectional area of such rod and attaining a temperature above the boiling point of said liquid in normal operation of said apparatus under full-load conditions, whereby turbulent vaporization of liquid at the surface of said coil assembly displaces adjacent boundary layers of said liquid and enhances heat conduction from the entire surface of said coil assembly to said liquid.

3. An electrical induction apparatus according to claim 2 wherein the exposed surface area of each said heat-conducting rod is no greater than several times the internal cross-sectional area of said rod and said rods are formed of a material chosen from the class comprising beryllium oxide and aluminum oxide.

4. A electric coil assembly adapted for immersion in a body of cooling liquid having a vaporization temperature slightly above the normal full-load operating temperature of the surface of said coil assembly comprising, a conductive winding, a cast body of resinous insulating material encapsulating said winding, and a plurality of dielectric heat-conducting rods embedded in said winding transversely of the winding turns and having head portions exposed substantially at the outer surface of said coil assembly, the head portions of said rods being of sufficiently small surface area that when said coil is immersed in said fluid under load current conditions said head portions constitute boiling sites for effecting turbulent displacement of liquid boundary layers adjacent the surface of said coil assembly.

5. An electric coil assembly according to claim 4 wherein said cast body of insulating material is formed of an epoxy resin and said heat-conducting rods are formed of a material chosen from the class consisting of beryllium oxide and aluminum oxide.